UNITED STATES PATENT OFFICE.

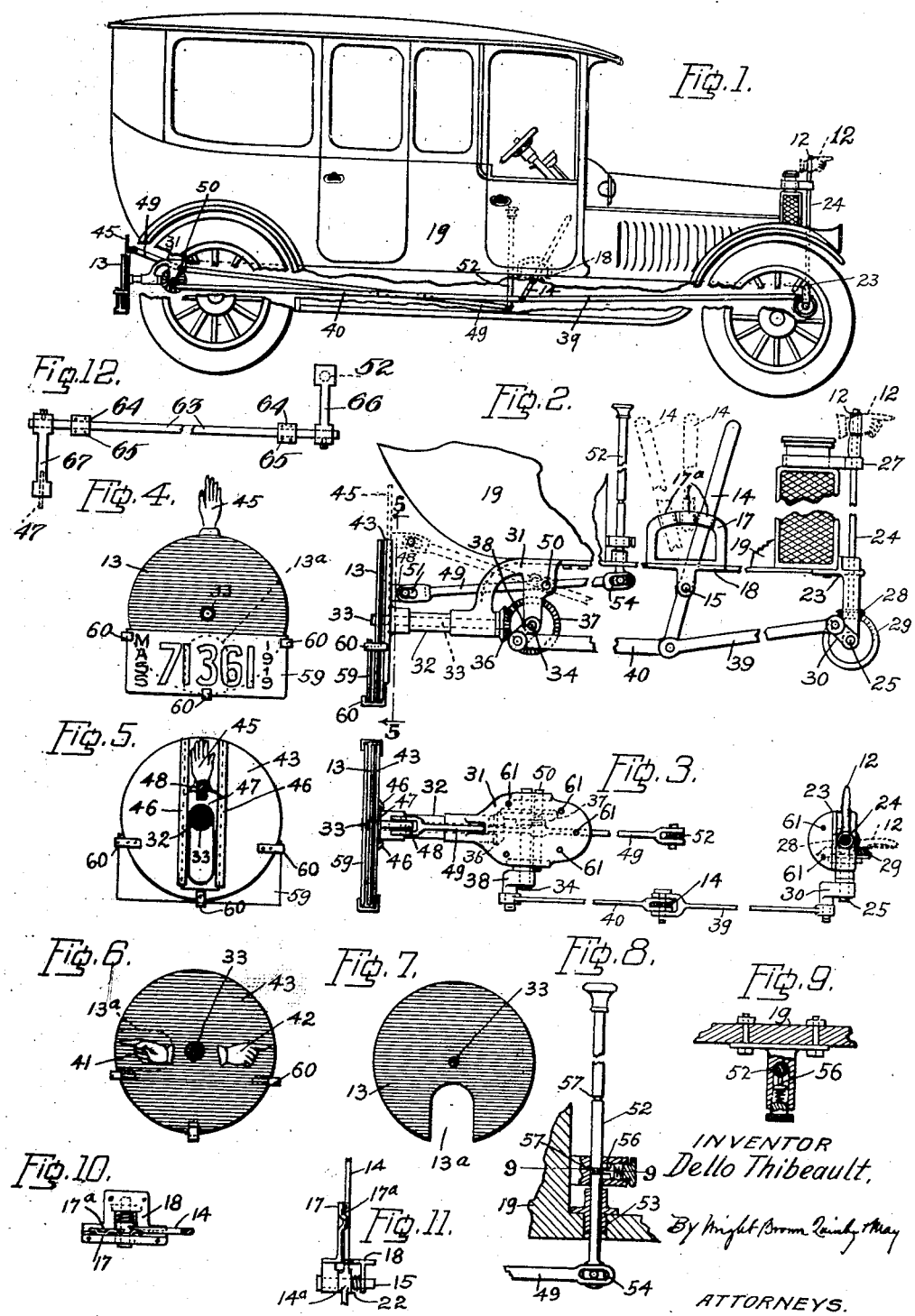

DELLO THIBEAULT, OF CAMPELLO, MASSACHUSETTS, ASSIGNOR OF ONE-HALF TO ALFRED J. VEILLEUX, OF BROCKTON, MASSACHUSETTS.

AUTOMOBILE SIGNAL MECHANISM.

1,347,063. Specification of Letters Patent. Patented July 20, 1920.

Application filed October 1, 1919. Serial No. 327,768.

*To all whom it may concern:*

Be it known that I, DELLO THIBEAULT, a citizen of the United States, residing at Campello, in the county of Plymouth and State of Massachusetts, have invented new and useful Improvements in Automobile Signaling Mechanism, of which the following is a specification.

This invention relates to signals for an automobile, adapted to be set by the driver to indicate, both at the front and the rear end, the direction in which the vehicle is about to turn.

The chief object of the invention is to provide an improved manually operable signaling mechanism, including a front and a rear signaling member, both adapted to be quickly set and securely confined in different predetermined positions.

Another object of the invention is to provide a signaling mechanism of the character stated, the elements of which are adapted to be conveniently applied to automobile bodies of different makes without requiring objectionable structural changes or modifications.

Another object of the invention is to provide a rear end signaling mechanism which includes not only a member indicating the direction in which the vehicle is about to turn, but also a stop-signaling member indicating to an observer behind, that the vehicle is about to stop. To these and other related ends the invention consists in the improvements which I will now proceed to describe and claim.

Of the accompanying drawings forming a part of this specification,

Figure 1 is a side view of an automobile equipped with signaling mechanism embodying the invention.

Fig. 2 is a fragmentary side view showing the signaling mechanism on a larger scale.

Fig. 3 is a top plan view of the elements of the signaling mechanism shown by Fig. 2, the automobile body being removed and transverse sections of some of the elements being shown.

Fig. 4 is a rear elevation showing the rear direction signaling member, the stop-signaling member and a number plate, the stop-signaling member being exposed.

Fig. 5 is a section on line 5—5 of Fig. 2 and an elevation of the parts at the left of said line, the stop signaling member being concealed.

Fig. 6 is a rear elevation, showing the fixed holder having oppositely directed pointers, hereinafter described, the rear direction signaling member and the number plate shown by Fig. 4 being removed.

Fig. 7 is a rear elevation showing only the rear direction signaling member.

Fig. 8 is an enlargement of a portion of Fig. 2, parts being shown in section.

Fig. 9 is a section on line 9—9 of Fig. 8.

Fig. 10 is a top plan view of the actuating lever and the bracket on which said lever is fulcrumed.

Fig. 11 is an edge view of the actuating lever and bracket.

Fig. 12 is a fragmentary top plan view showing a modification.

The same reference characters indicate the same parts in all of the figures.

My improved signaling mechanism comprises a front end signaling member 12 which is preferably a pointer fashioned to resemble a human hand, a rear end signaling member 13 (shown separately by Fig. 7) which is preferably a circular shield of sheet metal having an aperture $13^a$, a manually operable actuating member 14 which is preferably a hand lever adapted to swing on a fixed fulcrum 15, and torque-transmitting connections between the actuating members and the signaling members, whereby the two signaling members are turned in unison.

The elements of the signaling mechanism are so connected that neither element is independently movable, all being moved when force is exerted on the actuating member, so that each of the signaling members 12 and 13 is moved to the same extent as the other. The arrangement is such that when the member 12 points, for example, to the left, the aperture $13^a$ is at the left side of the axis of the member 13, and coöperates with one of the two oppositely directed fixed pointers hereinafter described, in indicating to an observer behind that the vehicle is about to turn to the left.

With the signaling mechanism is combined means for releasably confining said mechanism with the signaling members in different predetermined positions, that is to say, in position to indicate that the vehicle is about to turn to the right, in position to indicate that the vehicle is about to turn to the left, and in an intermediate position indicating that no immediate deviation from a straight course is to occur. Said confining means may be embodied in a fixed segmental bar 17 forming a part of a bracket 18 rigidly attached to the automobile body 19 between the front and rear ends of the latter, the bar being provided with notches 17$^a$ arranged to engage the lever 14 and hold the latter in either of the three positions shown by full and dotted lines in Fig. 2. The arrangement is preferably such that when the lever is in the full line position, the signaling members 12 and 13 are in one of their operative positions, the member 12 pointing to the left, as shown by full lines in Fig. 2, and the aperture 13$^a$ being in the position shown by dotted lines in Fig. 6. When the lever 14 is in the left hand dotted line position the member 12 points to the right and the aperture 13$^a$ is at the side of the axis of the member 13 opposite that shown by Fig. 6. When the lever is in the intermediate position shown by Fig. 2, the members 12 and 13 are in their neutral positions, the member 12 pointing forward, and the orifice 13$^a$ being below the axis of the member 13 as shown by Fig. 7.

The bracket 18 supports a stud which constitutes the fulcrum 15 of the lever 14. The hub 14$^a$ of the lever 14 is movable laterally on the fulcrum stud and is pressed by a spring 22 into separable engagement with the notched bar 17, as shown by Figs. 10 and 11, the lever being laterally movable against the force of the spring to disengage it from the notched bar.

I do not limit myself to the above described means for releasably securing the lever 14 and the connected elements of the signaling mechanism, it being obvious that various other means may be provided for maintaining the signaling members in the several predetermined positions above described.

I will next describe the preferred torque-transmitting connections between the signaling members 12 and 13 and the actuating member or lever 14, 23 represents a shaft hanger or bracket attached to the forward end of the automobile body and provided with a vertical bearing in which is journaled a vertical rock shaft 24, and with a transverse horizontal bearing in which is journaled a transverse rock shaft 25. The signaling member 12 is fixed to the upper end of the rock shaft 24 and said rock shaft may be additionally supported by an upper bearing 27. The rock shafts 24 and 25 are connected by a small bevel gear 28 fixed to the shaft 24, and a larger bevel gear 29 fixed to the shaft 25. To one end of the transverse rock shaft 25 is fixed a crank arm 30. 31 represents a shaft hanger or bracket attached to the rear end of the body, and provided with a tubular extension 32 constituting a longitudinal horizontal bearing in which is journaled a transverse rock shaft 34. The signaling member 13 is fixed to the longitudinal rock shaft 33. The rock shafts 33 and 34 are connected by a smaller bevel gear 36, fixed to the shaft 33, and a larger bevel gear 37 fixed to the shaft 34. To one end of the transverse rock shaft 34 is fixed a crank arm 38.

The actuating lever 14 is connected by connecting rods 39 and 40 with pins on the crank arms 30 and 38. While the front signaling member 12 acts directly or unaided as a direction indicator, the rear member 13 as here shown requires the aid of a pair of oppositely directed fixed pointers 41 and 42, painted on or otherwise applied to one side of a fixed holder 43, which is preferably a disk attached to the tubular extension 32 of the rear hanger 31, the margin of the disk being concentric with said extension. The pointers 41 and 42 are at opposite sides of the axis of the member 13, and the arrangement is such that when said member is turned to one of its operative positions, the pointer 41 is visible through the aperture 13$^a$ as indicated by dotted lines in Fig. 6, and when the member is turned to its operative position the pointer 42 is visible through the said aperture. When the member 13 is turned to the neutral position shown by Fig. 7 each of the pointers is concealed.

I utilize the holder 43 and rear hanger 31 for the purpose of supporting a stop-signaling member 45 which may be in the form of a flat human hand.

The holder 43 is provided at its inner side with a vertical guide composed of parallel ears or guide members 46. The signaling member 46 is attached to a slide 47 which is movable vertically in said guide and is provided with an ear 48. 49 represents a lever fulcrumed at 50 on the rear hanger 41. One arm of said lever is loosely connected with the slide ear 48 by studs on said ear entering slots 51 in the lever. 52 represents an actuating member which is preferably a plunger movable vertically in a fixed guide 53 and loosely connected at its lower end with the other arm of the lever 49, by studs on the plunger entering slots 54 in the lever.

When the plunger 52 is in the raised position shown by Figs. 1, 2 and 8, it holds the slide 47 depressed, the stop signaling member 45 being concealed by the holder 43. When the plunger is depressed the slide and the member 45 are raised until said member is exposed as shown by Fig. 4. The plunger is releasably confined in either of the positions stated, by a spring pressed detent 56, Fig. 8, and one of two grooves 57 formed in the plunger. When the plunger is raised the detent 56 engages the lower groove and when the plunger is depressed the detent engages the upper groove, the slide 47 and the stop-signaling member 45 being confined both in its concealed and its exposed position.

The holder 43 may be utilized to support a number plate 59 and to this end is provided with bent ears 60 formed to extend across the margins of the holder 43 and signaling member 13, and support the plate 59 spaced from the member 13 as shown by Figs. 2 and 4.

The hangers or brackets 23 and 31 may be attached to bottom portions of the vehicle body by bolts, inserted in bolt holes 61 (Fig. 3) formed in the base portions of said hangers, this attachment involving no material or considerable change or adaption of the body.

The invention may be embodied in a signaling mechanism including a signaling member which may be either 12 or 13, at one end of the vehicle, a rock shaft which may be either 24 or 33, carrying said member, a hanger which may be either 23 or 31, attachable to the vehicle body and provided with a bearing for said rock shaft and with another bearing extending in a different direction, another rock shaft which may be either 25 or 34, journaled in the last mentioned bearing and provided with a crank arm, gears connecting said rock shafts, and an actuating lever 14 fulcrumed on the body adjacent to the hanger, and connected by a rod with said crank arm.

The connections between the plunger 52 and the stop-signaling member 47 may be embodied in a horizontal longitudinally extending rock shaft 63 journaled in bearings having bases 64 provided with bolt holes 65, an arm 66 fixed to and projecting in one direction from one end of the rock shaft and having a suitable loose connection with the plunger 52, and an oppositely projecting arm 67 fixed to the other end of the rock shaft and having a suitable loose connection with the slide 47 carrying the member 45. The arrangement is such that the depression of the plunger depresses the arm 66 and raises the arm 67 and the slide 47. When the plunger is raised the arm 66 is also raised, and the arm 67 and slide 47 are depressed.

The bearing bases 64 may be secured to the bottom of the body by bolts inserted in the holes 65.

I claim:

1. A signaling mechanism for automobiles comprising a relatively fixed holder-member carrying signal elements on one face thereof and a vertical guide on the opposite face thereof, a rotatably mounted shield arranged before the face of said member provided with the signals, said shield having a cut-away portion to selectively expose said signals when rotated, a member slidably mounted in said guideway on the other face of the holder member, said slide member being adapted to be reciprocated to project beyond and retracted within the confines of said holder.

2. An automobile signaling mechanism comprising a rear shaft hanger having a longitudinal horizontal bearing and a transverse horizontal bearing, a longitudinal rock shaft journaled in said longitudinal bearing and provided with a signaling member thereon, a transverse rock shaft journaled in said transverse bearing and provided with a crank arm, gears connecting said two last-mentioned rock shafts, an operating lever movable on a fixed fulcrum between the front and rear hangers, and rods connecting said lever with the crank arms of the two transverse rock shafts, combined with means for releasably confining said lever in different predetermined positions.

3. A signaling mechanism for automobiles, comprising a hanger, a holder fixed to said hanger and provided on its inner face with a vertical guide, a slide movable in said vertical guide and provided with a signaling member, a lever fulcrumed on said hanger and loosely connected at one end with said slide, a plunger vertically movable in a fixed guide and loosely connected with the opposite end of said lever, and means being provided for releasably confining the movement of the plunger.

4. An automobile signaling mechanism comprising shaft hangers having a longitudinal horizontal bearing and a transverse horizontal bearing, respectively, a signal holder fixed to the longitudinal bearing, a shaft rotatably journaled in the longitudinal bearing and provided with an indicator to coöperate in said signal holder, a transverse shaft rotatably journaled in a transverse bearing, gears connecting said shafts, an operating lever movable on a fixed fulcrum, and torque-transmitting connection between said lever and said transverse shaft.

5. An automobile signaling mechanism comprising a shaft hanger, having two bearings extending in different directions, a shaft journaled in one of said bearings and provided with a signaling member, a rock shaft journaled in the other bearing and provided with a crank arm, gears connecting said shafts, an operating lever movable on a fixed fulcrum adjacent to said hanger, and a rod connecting said lever with said crank arm.

6. An automobile signaling mechanism comprising a shaft hanger, having two bearings extending in different directions, a shaft journaled in one of said bearings and provided with a signaling member, a rock shaft journaled in the other bearing and provided with a crank arm, gears connecting said shafts, an operating lever movable on a fixed fulcrum adjacent to said hanger, and a rod connecting said lever with said crank arm, means being provided for releasably securing said lever in different predetermined positions.

7. A signaling mechanism for automobiles, comprising a signal holder provided on its inner face with a vertical guide, a slide movable in said vertical guide and provided with a signaling member, a lever fulcrumed intermediate its ends and loosely connected at one end with said slide, and a plunger vertically movable in a fixed guide and loosely connected with the opposite end of said lever.

In testimony whereof I have affixed my signature.

DELLO THIBEAULT.